July 31, 1923.

J. L. MUELLER 1,463,714

CHAIN WELDING MACHINE

Filed April 22, 1921

Inventor

J. L. Mueller

By C. A. Snow & Co.

Attorneys

July 31, 1923.

J. L. MUELLER 1,463,714

CHAIN WELDING MACHINE

Filed April 22, 1921

Inventor

J. L. Mueller

By C. A. Snow & Co.

Attorneys

July 31, 1923.

J. L. MUELLER 1,463,714

CHAIN WELDING MACHINE

Filed April 22, 1921

Inventor
J. L. Mueller
By C. A. Snow & Co.
Attorneys.

July 31, 1923.

J. L. MUELLER

CHAIN WELDING MACHINE

Filed April 22, 1921

Inventor
J. L. Mueller
By C. A. Snow & Co.
Attorneys.

Patented July 31, 1923.

1,463,714

UNITED STATES PATENT OFFICE.

JACOB LUDWIG MUELLER, OF YORK, PENNSYLVANIA.

CHAIN-WELDING MACHINE.

Application filed April 22, 1921. Serial No. 463,439.

*To all whom it may concern:*

Be it known that I, JACOB L. MUELLER, a citizen of the United States, residing at York, in the county of York and State of Pennsylvania, have invented a new and useful Chain-Welding Machine, of which the following is a specification.

The device forming the subject matter of this application is adapted to be employed for welding the links of a chain, after the links have been concatenated, and before the chain has been finished.

One object of the invention is to provide a machine of the sort above mentioned in which the transformer and the electrodes move toward and away from the chain whilst the chain is passing in a right line through the machine.

A further object of the invention is to improve the mechanism whereby the link is pressed and closed whilst the link is in the field of operation of the heating means.

Another object of the invention is the provision of novel means for finishing the link after the link has passed beyond the field of operation of the heating means.

A still further object of the invention is to improve the construction of the device whereby the chain is advanced.
Another object in view is to supply means whereby, when an abnormal tension exists in the chain, the circuit to the transformer will be opened.

It is proposed to provide means whereby an operator may cut off the current supply to the transformer and, in properly timed relation, couple up the driving and driven members, to the end that the operation of the machine may proceed.
It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

The device forming the subject matter of this application embodies a frame, which may include a table 1 supported on legs 2, a platform 3 above the table, and end plates 4 extended between the table and the platform.

One of the characteristic features of the machine is that the chain moves through the machine in a right line, the transformer being mounted for swinging movement, thereby to carry the electrodes forward and away from the chain.

A bracket 5 (Figures 13 and 2) is mounted on the table 1, a transformer 6 being pivoted at 7 upon the bracket 5, for swinging movement, the electrodes appearing at 8, and being adjustable, through the instrumentality of screws 9. A means is provided, whereby the transformer is swung, to move the electrodes 8 with respect to the chain (Figure 1), and with this end in view, pitmen 10 are pivoted at their forward ends (Figure 2) to the transformer 6, as shown at 111. The rear ends of the pitmen 10 terminate in forks 12 straddling the hubs of disks 14 (Figure 14) having cam grooves 15, the grooves receiving lateral projections, such as rollers 16, on the pitmen 10. The disks 14 are secured to a main shaft 17 journaled in the end plates 4 of the frame, and extended longitudinally of the machine.

It is obvious that when the shaft 17 is rotated, the cam disks 14, through the instrumentality of the pitmen 10, will impart swinging movement to the transformer 6, on the pivotal mounting 7 of the transformer, the electrodes 8 moving toward and away from the chain, as the chain passes in a right line, through the machine, from one end thereof to the other.

A means is provided whereby, at the proper time in the cycle of operation of the device, the link which is being welded, is closed together and held for an interval of time.

Figure 1:
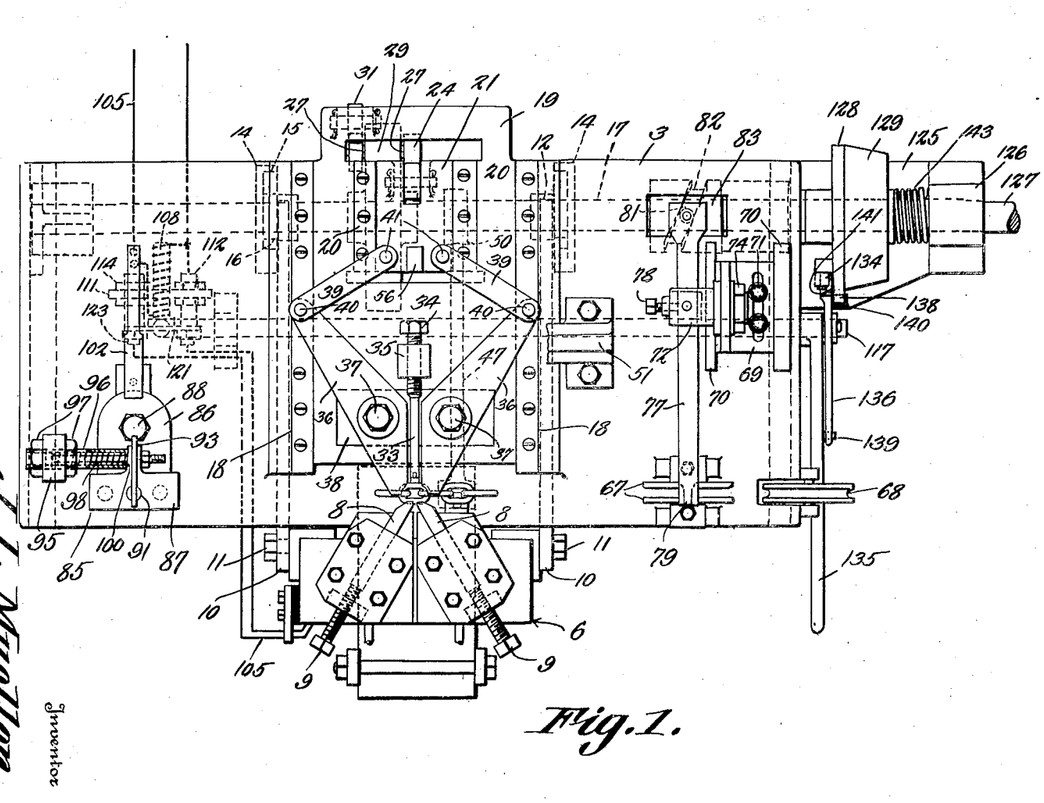
Figure 1 shows, in top plan, a machine constructed in accordance with the invention, parts being broken away.
Figure 2:
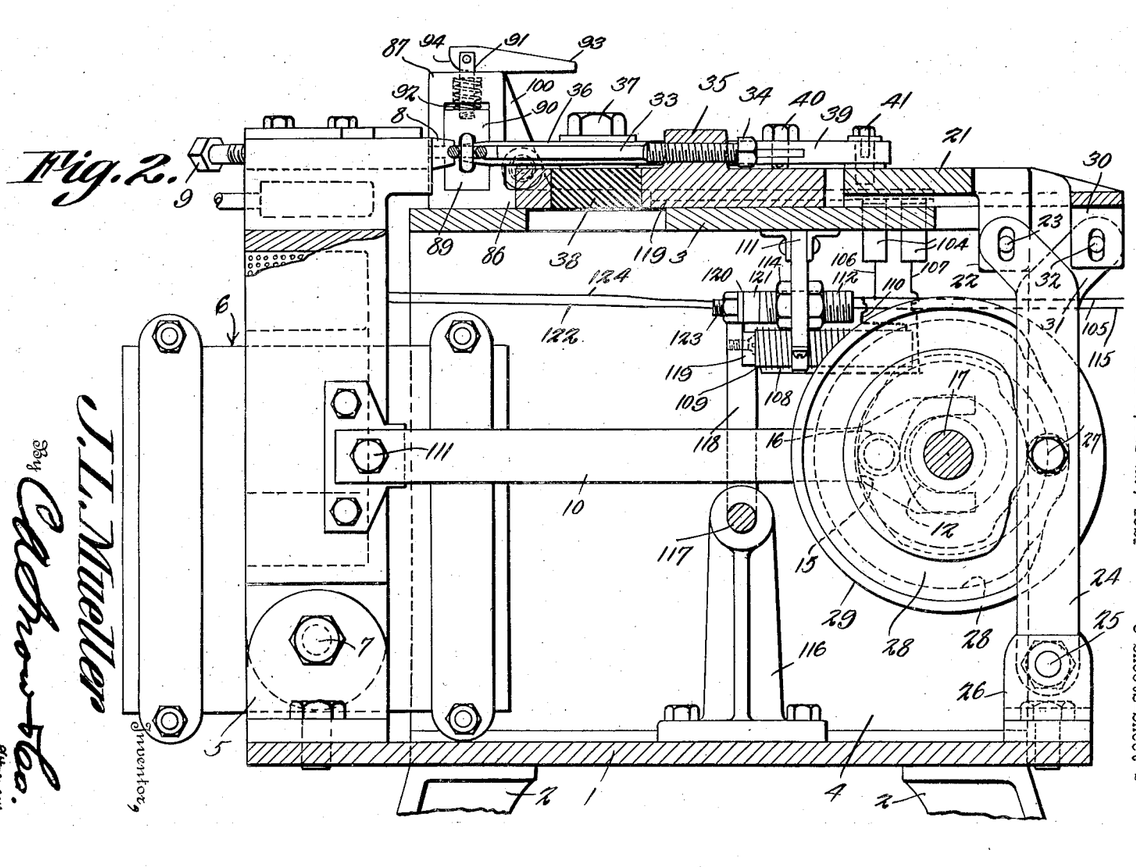
Figure 2 is a transverse section of the machine, taken from the front to the back thereof, sundry portions of the mechanism appearing in elevation.

Having in mind the end last above described, guides 18 are mounted on the platform 3, a main slide 19 being mounted on the platform, beneath the guides, for reciprocation transversely of the machine. The main slide 19, in its turn, is supplied with guides 20, retaining for reciprocation on the main slide 19, an auxiliary slide which is denoted by the numeral 21. Figures 1 and 2 disclose the slides, and Figure 3 may be noted, as to the slide 19. The auxiliary slide 21 has a depending lug 22, whereunto the upper end of a radius arm 24 is pivoted, as indicated at 23. The lower end of the radius arm 24 is mounted pivotally at 25 on a bracket 26 carried by the table 1. The radius arm 24, has a projection 27, which may be a roller, the projection being received in a cam groove 28 formed in one side of a disk 29 mounted on the main shaft 17. The main slide 19 is supplied with a depending lug 30, to which the upper end of a radius arm 31 is pivoted, as indicated at 32. The lower end of the radius arm 31 is mounted on the table 1 after the manner of the radius arm 24, and is operated from the disk 29 as is the radius arm 24; that is, the radius arm 31 has a projection like the part 27, engaged in a cam groove, corresponding to the cam groove 28, but located on the opposite side of the disk 29.

An adjustable abutment is provided, for the link which is being welded, the abutment, denoted by the numeral 33, being carried by a screw 34 which is threaded into a lug 35 on the main slide 19. Pressure members 36, in the form of levers of the first order, are located on opposite sides of the element 33 and are fulcrumed, intermediate their ends, as at 37, on a block 38 of insulating material, carried by the main slide 19. The forward ends of links 39 are pivoted at 40 to the rear end of the levers 36, the rear ends of the links being mounted pivotally at 41 on the auxiliary slide 21.

When the shaft 17 is rotated, swinging movement will be imparted to the radius arms 24 and 31 from the cam disk 29. The arm 31 will impart reciprocation to the main slide 19, and will move the main slide with respect to the platform 3. The arm 24 will cause a reciprocation of the auxiliary slide 21 on the main slide 19. As a result of the foregoing, the pressure members 36 are advanced with respect to the link to be welded, and are closed upon the link, to compress the link, when the auxiliary slide 21 is moved on the main slide 19, the links 39 tending to separate the rear ends of the members 36 and to cause the forward ends of the members 36 to engage the link. When the slide 19 is retracted, the pressure members 36 are separated at their forward ends, and are retracted, in a manner which will be obvious from what has been stated hereinbefore in regard to the advancement of the slide 19 and as to the relative movement between the slides.

After the link has been welded at the electrodes 8 and has been closed by the action of the pressure members 36, the part of the link which has been welded, is shaped and finished. This shaping takes place after the link has been advanced a step, out of the field of operation of the electrodes and the pressure members. This operation consists of two steps, to wit, the shaping of the link and the advancement of the link. Of these in the order mentioned, consider first the means for shaping the link, and, secondly, the means whereby the link is advanced into the field of operation of the shaping mechanism.

Figure 4:
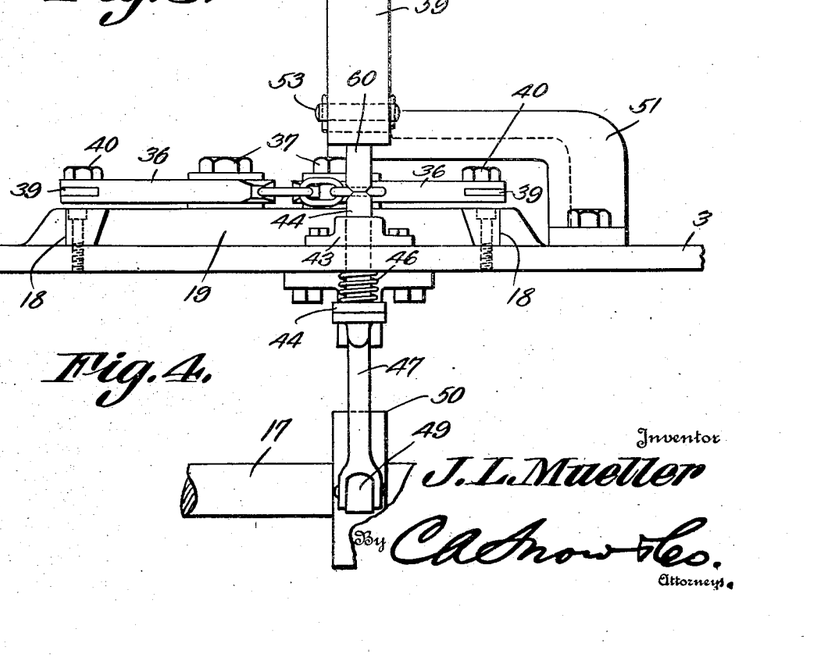
Figure 4 is an elevation showing that part of the machine which is depicted in Figure 3.
Figure 5:
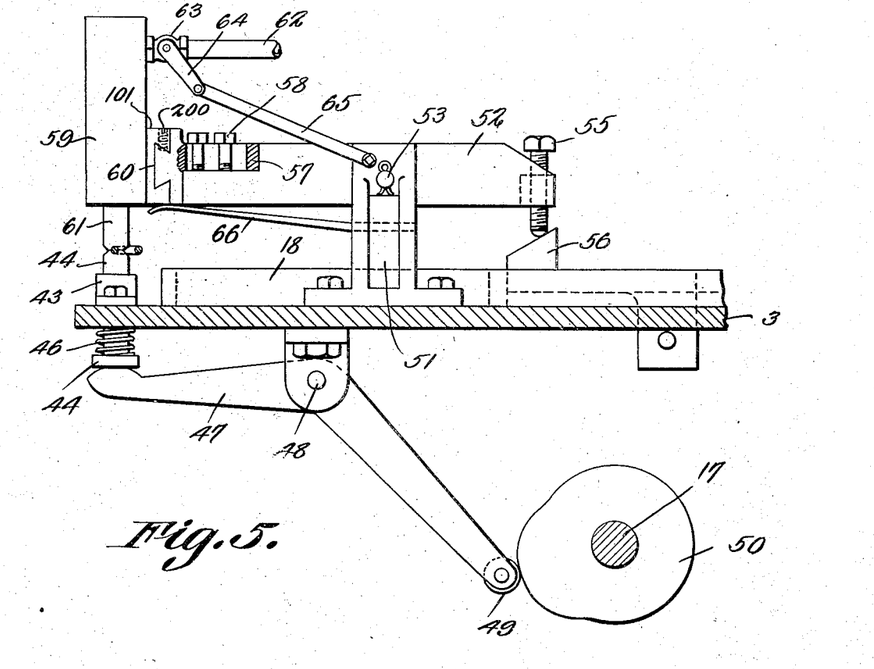
Figure 5 is a fragmental transverse section showing, in side elevation, those parts which are delineated in top plan in Figure 3.

The means for shaping the link, after the link has been closed and welded, embodies a vertically movable anvil 44, which, as indicated in Figures 4 and 5, is slidable vertically in a guide 43 on the platform 3. The anvil 44 has a head 45 on its lower end, an expansion spring 46 surrounding the lower portion of the anvil, and being located between the head 45 and the platform 3. The obvious function of the spring 46 is to move the anvil downwardly, the anvil being raised, at a proper point in the cycle of the machine, by a lever 47, engaging the part 44 of the anvil, and fulcrumed intermediate its ends, as at 48, on the platform 3. An antifriction element, such as a roller 49, is journaled on the inner end of the lever 47 and coacts with a cam 40 on the main shaft 17.

Figure 3:
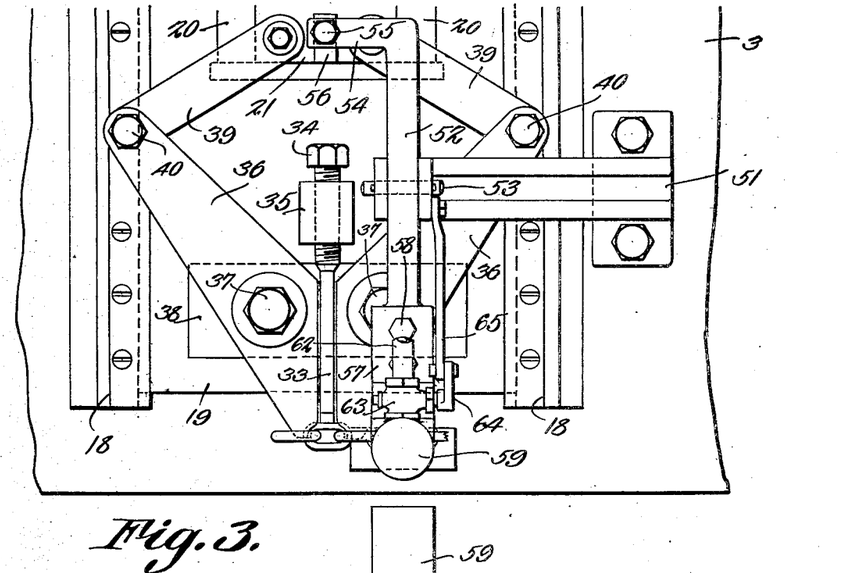
Figure 3 is a fragmental top plan, enlarged from Figure 1, and showing certain elements which have been omitted in Figure 1, for the sake of clearness;

An overhanging arm 51 is mounted on the platform 3. A lever 52 is fulcrumed at 53 on the arm 51, as shown in Figures 5 and 3, the inner end of the lever being offset as at 54, and carrying an adjustable element, disclosed in the form of a screw 55, adapted to cooperate with a cam block 56 on the auxiliary slide 21. Motion is transmitted from the slide 21 to the lever 52, by way of the cam block 56 and the screw 55, the throw of the lever being regulated by adjusting the screw 55. The lever 52 carries and includes an extension 57 which is adjustable longitudinally of the lever, the extension being held in adjusted positions by securing elements 58.

The numeral 59 marks a cylinder having a projection 101, dove-tailed at 60 to the extension 57, for adjustment transversely of the lever 52, the cylinder being held in adjusted positions, by a screw 200, threaded into the part 101, and engaging the forward portion of the extension 57. A hammer 61 is mounted for reciprocation in the cylinder 59 and cooperates with the anvil 44, to shape the link. Since the extension 57 can be adjusted longitudinally of the lever 52, and because the cylinder 59 can be adjusted transversely of the extension, the hammer 61 may be positioned properly with respect to the anvil 44, it being obvious that a fine and accurate adjustment between these parts is desirable. In order to control the downward swinging movement of the forward end of the lever 52, under the actuation of the cam block 56, a spring strip 66 is secured at one end to the arm 51, the opposite end of the strip exerting an upward pressure on some of the parts which are located at the outer end of the lever 52. For the reciprocation of the hammer 61, fluid pressure is supplied to the cylinder 59 through a pipe 62, a valve 63 being interposed in the pipe, the valve comprising a crank arm 64, connected by a link 65 to the member 51.

Assuming that the link has been advanced into a position to be operated upon by the hammer 61 and the anvil 44, the anvil is raised by the lever 47, the lever being actuated by the cam 50, when the shaft 17 is rotated. The auxiliary slide 21, advancing, carries the cam block 56 forwardly beneath the screw 55, the lever 52 is tilted, the hammer 61 is carried downwardly toward the link, and fluid pressure is admitted to the cylinder 59 from the pipe 62, to secure the reciprocation of the hammer. When the lever 52 tilts, the valve 63 is opened, due to the action of the link 65 on the arm 64 of the valve. When the slide 21 is retracted, and when the cam block 56 is retracted with respect to the screw 55, the spring 66 reacts on the lever 52 and swings the forward end of the lever, together with the cylinder 59 and the hammer 61, upwardly, the link 65 then operating, through the arm 64, to close the valve 63 and to cut off the fluid pressure supply to the cylinder 59.

It has been stated hereinbefore that a mechanism is provided, whereby the chain, and, specifically, the welded link, is advanced from the electrodes 8 and the pressure members 36 to the link-shaping means last above described and shown in Figures 4 and 5. For an understanding of the means for advancing the chain, let Figures 10, 11 and 1 be noted, in connection with the following description.

Figure 6:
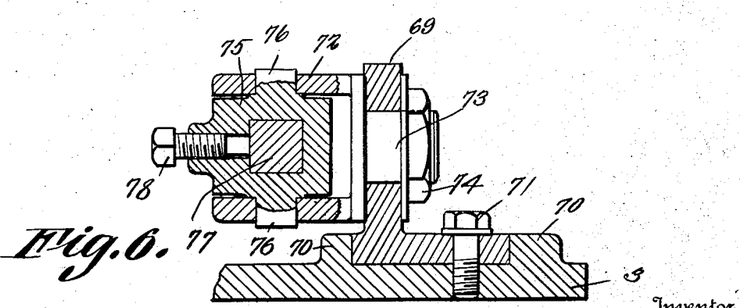
Figure 6 is a sectional view illustrating in detail, the means whereby one of the levers is fulcrumed for compound movement;
Figures 10, 11:
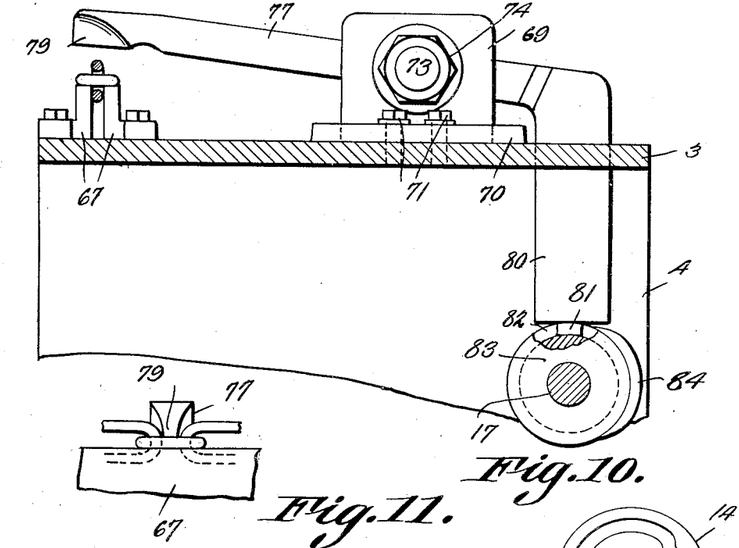
Figure 10 is a transverse section in which the means for advancing the chain appears in elevation.
Figure 11 is a detail, in the nature of a front elevation, the view illustrating the means whereby movement is immediately imparted to the chain.

The chain moves upon and between two guides or supports 67 on the platform 3, and leaves the machine over a sheave 68 which, as shown in Figure 1, is journaled upon one end of the platform 3. A standard 69, in the form of an angle member, is mounted for adjustment between ribs 70 (Figure 6) on the platform 3, the standard being held to the platform by securing elements 71. The numeral 72 denotes a yoke having a stem 73 mounted to rock in the upright portion of the standard 69 and held for rocking movement therein by a nut or the like, marked by the numeral 74. Disposed within the yoke 72 is a carrier 75 having trunnions 76, the trunnions being received for rocking movement in the upper and lower portions of the yoke 72. A lever 77 passes through the carrier 75 and is held in adjusted positions therein by a set screw 78 threaded into the carrier At its forward end, the lever 77 is supplied with a thinned beak 79, adapted to engage between adjacent vertical links of the chain, as shown in Figure 11. The lever 77 embodies a depending rear end 80 extended downwardly through an opening in the platform 3 and terminating in reduced finger 81. The finger 81 is received in a cam groove 82 formed in a disk 83 mounted on the shaft 17. The groove 82 includes, as indicated in Figure 1, a part which is inclined with respect to the axis of the shaft. The disk has a rib 84 which outstands in a plane at right angles to the axis of the shaft 17, the rib cooperating with the end of the part 80 of the lever 77.

Noting the shape of a part of the groove 82, as indicated in Figure 1, it will be obvious that when the finger 81 rides in said part of the groove, a horizontal swinging movement will be imparted to the lever 77. The rib 84 imparts a vertical swinging movement to the lever 77. The lever, therefore, acquires a compound movement, which permits the beak 79 of the lever to move upwardly and downwardly from the position of Figure 11, and to move horizontally from the position of Figure 11. The result of this movement of the beak 79 is that the beak will engage between successive vertical links in the chain, and move horizontally, thereby advancing the chain. The vertical component in the movement of the lever 77 is accommodated, because the stem 73 of the yoke 72 can rock in the upright part of the standard 69. Allowance is made for the horizontal component in the movement of the lever 77, since the trunnions 76 of the carrier 75 have rocking movement in the upper and lower portions of the yoke 72, the axis of the stem 73 being located at right angles to the axis of the trunnions 76.

In the opening portion of the description, it was stated that the chain was held for right line movement, the transformer 6 swinging toward and away from the chain. The chain is held for right line movement, to the right hand of the transformer 6 and the members 36 (Figure 1) by the guides 67 and the lever 77, as above explained. To the left of the transformer 6 and the members 36, the chain is held for right line movement by a guide 85.

Figures 12, 13, 14:
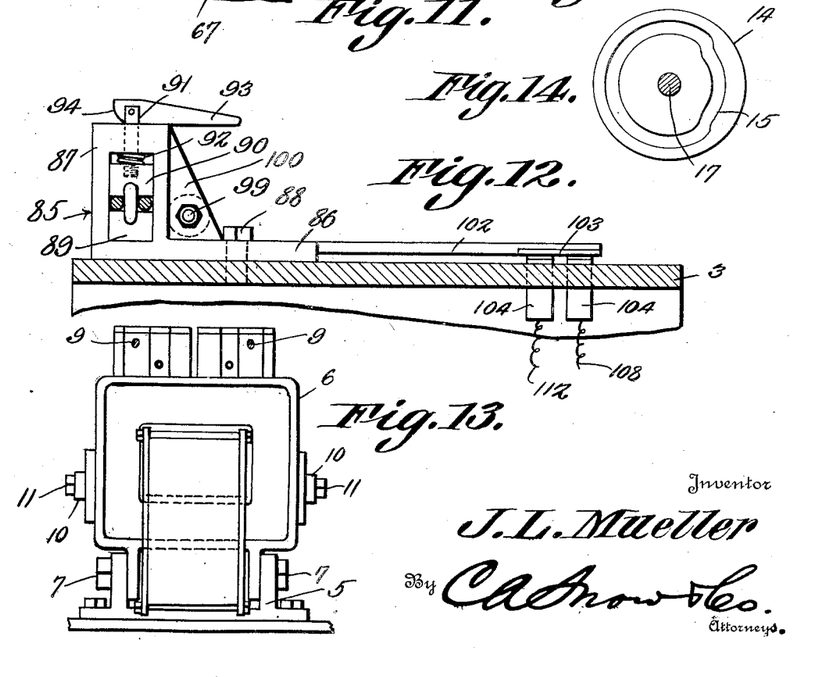
Figure 12 is a sectional view, showing in elevation, one of the chain guides, together with the means whereby, under certain conditions, the circuit to the transformer is opened.
Figure 13 is an elevation showing the transformer and the means whereby the same is mounted for swinging movement toward and away from the chain which is to be welded.
Figure 14 is an elevation disclosing one of the cam disks.

The guide 85 is a composite structure, and its construction will be understood best if Figures 12, 2 and 1 are referred to. The guide 85 embodies a base plate 86 and an upstanding body 87. The base plate 86 is pivoted at 88 to the platform 3. It is only in case of emergency, as hereinafter explained, that the guide 85 has swinging movement on the pivot element 88, the guide ordinarily remaining fixed to direct the straight line movement of the chain. The guide is held yieldingly against swinging movement by a mechanism shown in Figure 1 and including a post 95 on the platform 3, a tube 96 being held in the post by nuts 97. Disposed within the tube 96 is a compression spring 98, the outer end of which is held by the tube 96, the inner end of the spring being engaged by one end of a plunger 99 mounted in a fin 100 (Figure 12) connected to the parts 87 and 86 of the guide 85. A fixed lower member 89 is mounted in the body 87 of the guide, and an upper member 90 is mounted for sliding adjustment in the body, the member 90 having a stem 91 slidable in the upper portion of the body. A compression spring 92 surrounds a portion of the stem 91 and engages the upper member 90 and the body 87, the spring tending to move the upper member 90 downwardly, so that it will cooperate yieldably with the chain, as shown in Figure 12. To the end that the upper member 90 may be raised, upon occasion, a lever 93 is pivoted to the upper end of the stem 91 and has a cam end 94, adapted to bear upon the upper end of the body 87.

An arm 102, of insulating material, if desired, projects from the base plate 86 of the guide 85 and may be considered as a part of the guide. The arm 102 carries a conducting bridge 103 adapted to engage a pair of terminals 104 mounted in the platform 3. The numeral 105 designates a conductor to which one of the terminals 104 is connected, as shown at 106 in Figure 2. The other terminal 104 is connected at 107 to the winding 108 of a solenoid magnet, the magnet being denoted by the numeral 109. The winding of the magnet is connected at 110 to the conductor 105. The magnet 109 is mounted in a hanger 111 depending from the platform 3, the hanger carrying terminals 112, the conductor 105 leading to one terminal, and a conductor 115 leading to the other terminal, the terminals being held in the hanger 111 by nuts 114 or otherwise.

A bearing 116 is supported on the table 1, a shaft 117 being mounted to rock in the bearing and in one of the end plates 4 of the machine, the shaft having an upstanding crank arm 118 to which an armature 119 is secured, the armature being responsive to the solenoid magnet 109. At its upper end, the crank arm 118 carries an insulating cross piece 120 to which contact members 121 are attached by securing elements 123. The contact members 121 are adapted to engage the terminals 112. From one securing element 123, a conductor 122 leads to the transformer 6, this conductor being in electrical connection with the conductor 115, when the contact member which is individual to the conductor 122 is closed upon the corresponding terminal 112. From the other securing element 123, a conductor 124 leads to the transformer 6, this conductor being in electrical connection with the conductor 105, when the contact member 121 which is individual to the conductor 124 is closed upon the corresponding terminal 112.

Let it be supposed that, owing to a tangling of the chain, or otherwise, an abnormal pull is exerted on the guide 85, causing the guide to swing on its pivotal mounting 88, the spring 98 being compressed. Then, the arm 102, participating in the swinging movement of the guide 85, will retract the conducting bridge 103 from the terminals 104, thereby opening the circuit of which the conductors 105, 115, 122 and 124 form parts. The current supply thus is cut off automatically, in case of accident, and the fusing action of the electrodes 8 ceases, thereby preventing a melting of the chain, and other similar consequences.

One of the end plates 4 of the frame supports an extension or bracket 125, having a bearing 126. In the bearing 126, a power-driven shaft 127 is journaled, this shaft being alined axially with the shaft 17 and forming, in effect, a part thereof, since the shafts are connected by a clutch mechanism, which will now be described.

Figure 7:
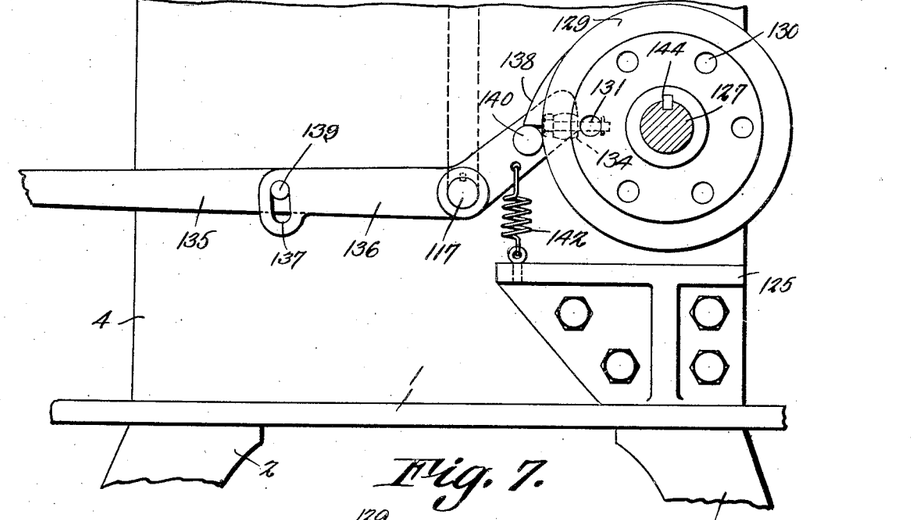
Figure 7 is an elevation wherein certain parts of the mechanism immediately under the control of an operator appear.
Figures 8, 9:
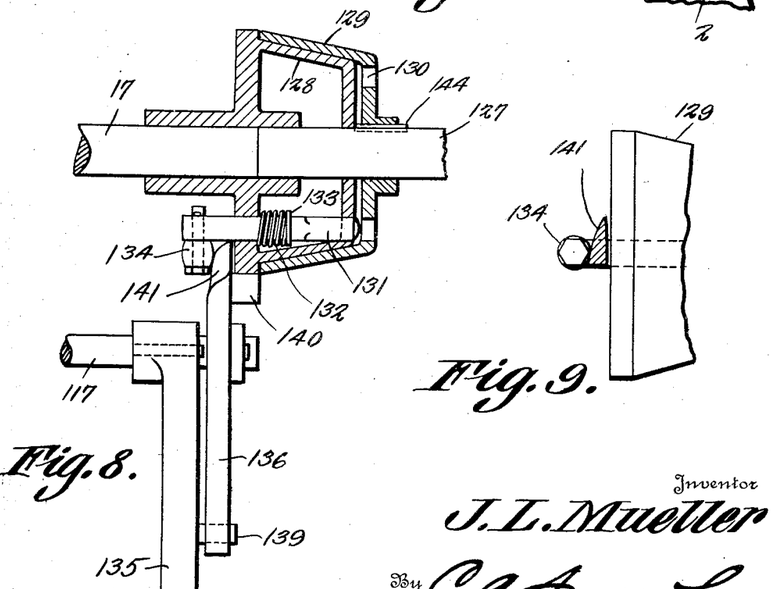
Figure 8 is a top plan, disclosing the mechanism shown in Figure 7, parts being in section.
Figure 9 is an elevation wherein the clutch members of Figure 8 are shown, a portion of the lever being in section.

A clutch member 128 (Figure 8) is attached to the shaft 17 and has an outstanding shoulder 138 (Figure 7). A clutch member 129 is splined at 144 to the shaft 127 and has frictional engagement with the clutch member 128, under the compulsion of a compression spring 143 (Figure 1) interposed between the bearing 126 and the clutch member 129 and surrounding a portion of the shaft 127. The clutch members 129 and 128 are held in driving engagement, by the action of the spring 143. This driving engagement is not of such a positive nature as to prevent the shaft 127 from rotating at times independently of the shaft 17, when the shaft 17 is held by engagement between the shoulder 138 on the clutch member 128 and a stop or projection 140 (Figure 7) to be described and alluded to hereinafter. Let it suffice at this point to say that, through the instrumentality of the clutch members 128 and 129, together with the spring 143, rotation is imparted from the shaft 127 to the shaft 17, until the rotation of the shaft 17 is stopped by the cooperation between the parts 138 and 140, and that, thereafter, the power-driven shaft 127 may rotate without driving the shaft 17, the parts 129 and 128 having relative slipping or sliding movement on each other, under the torque derived from the shaft 127.

It is possible to lock the clutch members 128 and 129 together positively, a pin 131 bringing about this result. The pin or latch 131 is mounted slidably in the clutch member 128 and is adapted to be received in any of a plurality of openings 130 formed in the end of the clutch member 129. A spring 132, surrounding the latch pin 131, and interposed between the base of the clutch member 128 and an abutment 133 on the latch pin, constitutes means for advancing the latch pin to cause the same to cooperate with the openings 130. On the exposed end of the latch pin 131, a roller 134 or like projection is mounted.

At 135 there appears an operating member or handle which is secured to the shaft 117. A pin 139 projects laterally from the handle 135. A lever 136 is mounted to swing on the shaft 117, and is supplied at one end with an elongated slot 137, receiving the pin 139 on the handle or operating member 135, a lost motion connection between the parts 136 and 135 thus being afforded. A retractile spring 142 connects the inner end of the lever 136 with the extension or bracket 125 and tends to swing the inner end of the lever downwardly, so that a projection 140 (hereinbefore alluded to) on the lever is brought into engagement with the edge of the base of the clutch member 128 (Figure 8) and is disposed in the path of the shoulder 138 (Figure 7) on the clutch member 128. The inner end of the lever 136 is equipped with a cam surface 141 (Figures 8 and 9) to facilitate the passage of the inner end of the lever between the roller 134 and the base of the clutch member 128, thereby effecting a retraction of the latch pin 131.

Suppose that the pressure levers 36 and the electrodes 8 are engaged with the link, as shown in Figure 1, the solenoid magnet 109, (Figure 2), being energized, and the armature 119 holding the arm 118 in such a position that the contact members 121 engage the terminals 112. Then, current can flow with respect to the transformer 6, through the conductors 105—124 and 115—122, and through the corresponding parts 121 and 112. When the welding has proceeded to such a stage as the judgment of the operator dictates, the handle 135 (Figure 7) is pressed downwardly. At the beginning of the downward movement of the handle 135, the shaft 117 is rocked, but the lever 136 is not operated, because the pin 139 in the handle has an appreciable movement in the slot 137 of the lever 136. When the shaft 117 is rocked, the arm 118 (Figure 2) is swung, the contact members 121 are retracted from the terminals 112, and the current supply to the transformer 6 is cut off.

Continued downward swinging movement of the handle 135 (Figure 7) brings the pin 139 to the end of the slot 137, and then the lever 136 is swung downwardly at its outer end and upwardly at its inner end, the projection 140 being withdrawn from engagement with the shoulder 138, and the cam end 141 of the lever passing out of engagement with the roller 134 on the latch pin 131. The latch pin 131 now advances, responsive to the spring 132, and, engaging in one of the openings 130 of the clutch member 129, couples the clutch members 129 and 128 positively, so that positive rotation is imparted from the power-driven shaft 127 to the shaft 17. Whilst the shaft 17 is being rotated positively from the shaft 127, the slides 19 and 21 are actuated, motion being transmitted to the pressure members 36, the cam disk 29 on the shaft 17 operating the slides by way of the radius arms 24 and 31. During the aforesaid rotation of the shaft 17, the chain is fed by the lever 77, the lever being actuated by the cam disk 83 on the shaft 17. The rotation of the shaft 17, further, operates the cam 50 and the cam 50 operates the lever 47 and the anvil 44, the lever 52 being actuated from the slide 21, and the link being finished off by the mechanism shown in Figure 5, all of these operations taking place in properly timed relation.

When the handle 135 is swung upwardly, the lever 136 responds to the action of the spring 142 (Figure 7), and the projection 140 on the lever is brought into engagement with the base of the rotating clutch member 128, and is disposed in the path of the shoulder 138. The roller 134, is carried around, with the clutch member 138, and rides on the cam surface 141 of the lever 136, the latch pin 131 being withdrawn. It has been pointed out hereinbefore that the spring 143 (Figure 1) causes the clutch member 129 to have a frictional hold on the clutch member 128. This frictional hold is sufficient to cause rotation to be imparted from the shaft 127 to the shaft 17, until the shoulder 138 on the clutch member 128 engages the projection 140 on the lever. After the shoulder 138 engages the projection 140, the shaft 17 rotates no longer, the clutch member 129 slipping on the clutch member 128. There is an advantage in bringing the shoulder 138 into engagement with the projection 140, since, when these elements are engaged, the slides 19—21, the lever 77 and the lever 52 are disposed in a definite relation, each, with respect to the chain which is being welded.

When the lever 135 is raised, as aforesaid, the shaft 117 is rocked, the arm 118 (Figure 2) being swung to the right, and the contact members 121 being brought into engagement with the terminals 112, current thus being supplied to the transformer 6, and the solenoid magnet 109 being energized, the magnet cooperating with the armature 119 to hold the arm 118 and the handle 135 (Figure 7) in the position shown. Although current thus is supplied to the electrodes 8, the welding of the link does not begin until the transformer is swung by the action of the pitmen 10 and attendant parts, to bring the electrodes against the link, when the shaft 17 is rotated.

I claim:—

1. In a chain welding machine, a device for advancing a chain in the direction of its length; a transformer comprising a heating mechanism; means for mounting the transformer for movement bodily toward and away from the chain; and means for moving the transformer and the heating mechanism in fixed relation to each other toward and away from the chain.

2. In a chain welding machine, a device for advancing a chain in the direction of its length; a transformer comprising a heating mechanism; means for mounting the transformer for swinging movement bodily in an arc toward and away from the chain; and means for imparting swinging movement to the transformer and the heating mechanism in fixed relation to each other.

3. In a chain welding machine, means for guiding a chain in the direction of its length; a transformer comprising a heating mechanism; means for mounting the transformer for movement bodily toward and away from the chain at an angle to the direction in which the chain moves; and means for moving the transformer and the heating mechanism in fixed relation to each other toward and away from the chain.

4. In a chain welding machine, electrodes adapted to engage one side of the link to be welded; means operating parallel to the line of advance of the chain and parallel to the electrodes for pressing the link on that side of the link which is opposite to the side wherewith the electrodes coact; means for advancing the link out of the field of operation of the electrodes and the pressing means; and mechanism for shaping that portion of the link which is operated upon by the pressing means, after the link has been advanced.

5. A chain welding machine, constructed as set forth in claim 4, and further characterized by the provision of means for mounting the electrodes for movement away from the link, before the link has been advanced out of the field of operation of the electrodes and the pressing means.

6. In a chain welding machine, a frame; means on the frame for welding and closing a link in a chain; a standard; means for mounting the standard on the frame for adjustment transversely of the line in which the chain is advanced; a yoke mounted on the standard to swing in a direction substantially parallel to that in which the chain is advanced; a carrier mounted on the yoke to swing on an axis substantially at right angles to the axis on which the yoke swings; a lever mounted in the carrier for adjustment longitudinally of the lever, the lever being provided with chain-engaging means; means for holding the lever in adjusted positions in the carrier; and means for operating the lever.

7. In a chain welding machine, a device for advancing a chain in the direction of its length; a heating mechanism; means for producing relative movement between the heating mechanism and the chain; a chain-shaping means cooperating with the chain after the chain has advanced beyond the field of operation of the heating mechanism; and an operative connection between said device and all of said means.

8. In a chain welding machine, a device for advancing a chain in the direction of its length; a heating mechanism; means for producing relative movement between the heating mechanism and the chain; a first pressure means positioned for engagement with the chain whilst the chain is in the field of operation of the heating mechanism; a chain-shaping means cooperating with the chain after the chain has left the field of operation of the heating mechanism and the first pressure means; and an operative connection between said device and all of said means.

9. In a chain welding machine, an electric welding means; a chain guide; means for mounting the guide movably, responsive to abnormal tension in the chain; a circuit for the welding means; and mechanism responsive to the movement of the guide for opening the circuit.

10. In a chain welding machine, a frame; means on the frame for heating and closing a link in a chain; and means for finishing the link, after the link has been advanced out of the field of operation of the heating means and the closing means, the finishing means embodying a reciprocatory hammer, means for operating the hammer, and mechanism for moving the hammer, independently of the reciprocation thereof, away from the link whereon the hammer has operated.

11. In a chain welding machine, a frame; means carried by the frame for heating and closing a link in a chain, and mechanism for shaping the link after the link has passed out of the field of operation of the heating and closing means, said mechanism embodying a lever fulcrumed on the frame, a hammer mounted for reciprocation on the lever, a fluid pressure means for operating the hammer, said means embodying a valve, and means responsive to the movement of the lever for operating the valve.

12. In a chain welding machine, an electrical heating mechanism; a circuit for said mechanism; a driving element; a driven element; means for coupling said elements together; means under the control of an operator for opening the circuit; a lost motion connection between the last specified means and the coupling means whereby the coupling means will become effective subsequent to the opening of the circuit; and a chain pressing device connected operatively with the driven element and operating whilst the chain is in the field of the heating mechanism.

13. In a chain welding machine, an electrical heating mechanism; a circuit for said mechanism; a driving element; a driven element; means for coupling said elements together; means under the control of an operator for opening the circuit; a lost motion connection between the last specified means and the coupling means, whereby the coupling means will become effective subsequent to the opening of the circuit; and a chain-shaping instrumentality connected operatively with the driven element and operating after the chain has passed from the field of the heating mechanism.

14. In a chain welding machine, an electrical heating mechanism; a circuit for said mechanism; a driven element; a driving element; means for coupling said elements together; means under the control of an operator for opening the circuit; a lost motion connection between the last specified means and the coupling means, whereby the coupling means will become effective subsequent to the opening of the circuit; and a chain-feeding device connected operatively with the driven element.

15. A chain welding machine, constructed as set forth in claim 12, and further characterized by the provision of a chain-shaping instrumentality connected operatively with the driven element and operating after the chain has passed from the field of the heating mechanism.

16. A chain welding machine, constructed as set forth in claim 12, and further characterized by the provision of a chain-feeding device connected operatively with the driven element.

17. A chain welding machine, constructed as set forth in claim 13, and further characterized by the provision of a chain-feeding device connected operatively with the driven element.

18. A chain welding machine, constructed as set forth in claim 12, and further characterized by the provision of a chain guide movable responsive to abnormal chain tension; and means operated by the guide for opening the circuit.

19. A chain welding machine, constructed as set forth in claim 13, and further characterized by the provision of a chain guide movable responsive to abnormal chain tension; and means operated by the guide for opening the circuit.

20. A chain welding machine, constructed as set forth in claim 14, and further characterized by the provision of a chain guide movable responsive to abnormal chain tension; and means operated by the guide for opening the circuit.

21. In a chain welding machine, an electrical heating mechanism; a circuit for said mechanism; a driving element; a driven element; means for coupling said elements together; means under the control of an operator for opening the circuit; a lost motion connection between the last specified means and the coupling means, whereby the coupling means will become effective subsequent to the opening of the circuit; a chain pressing device connected operatively with the driven element and active whilst the chain is in the field of the heating mechanism; a chain-shaping instrumentality connected operatively with the driven element and operating after the chain has passed from the field of the heating mechanism; and a chain-feeding device connected operatively with the driven element.

22. A chain welding machine constructed as set forth in claim 21, and further characterized by the provision of a chain guide movable responsive to abnormal chain tension; and means operated by the guide for opening the circuit.

23. In a chain welding machine, an electrical heating mechanism; means for mounting said mechanism for movement toward and away from the chain which is being welded; a circuit for said mechanism; a driving element; a driven element; means for coupling said elements together; means under the control of an operator for opening the circuit; a lost motion connection between the last specified means and the coupling means, whereby the coupling means will become effective subsequent to the opening of the circuit; and means for connecting the heating mechanism to the driven element, thereby to produce relative movement between the heating mechanism and the chain.

24. A chain welding machine, constructed as set forth in claim 23 and further characterized by the provision of means responsive to abnormal chain tension for opening the circuit.

25. A chain welding machine, constructed as set forth in claim 12 and further characterized by the provision of a device actuated by the means under the control of an operator for stopping the movement of the driven element at a predetermined time, after said elements have been uncoupled.

26. A chain welding machine, constructed as set forth in claim 13 and further characterized by the provision of a device actuated by the means under the control of an operator for stopping the movement of the driven element at a predetermined time, after said elements have been uncoupled.

27. A chain welding machine, constructed as set forth in claim 14, and further characterized by the provision of a device actuated by the means under the control of an operator for stopping the movement of the driven element at a predetermined time, after said elements have been uncoupled.

28. A chain welding machine, constructed as set forth in claim 21, and further characterized by the provision of a device actuated by the means under the control of an operator for stopping the movement of the driven element at a predetermined time, after said elements have been uncoupled.

29. A chain welding machine, constructed as set forth in claim 21 and further characterized by the provision of means responsive to abnormal chain tension for opening the circuit; and a device actuated by the means under the control of an operator for stopping the movement of the driven element at a predetermined time, after said elements have been uncoupled.

In testimony that I claim the foregoing as my own, I have hereto affixed my signature in the presence of two witnesses.

JACOB LUDWIG MUELLER.

Witnesses:
ROBT. H. STAGEMYER,
GEORGE S. SCHMIDT, Jr.